(12) United States Patent
Vazquez

(10) Patent No.: US 9,309,662 B2
(45) Date of Patent: *Apr. 12, 2016

(54) ELEVATED LIVING SPACE ASSEMBLY AND METHOD

(71) Applicant: Carlo Alberto Vazquez, Mexico (MX)

(72) Inventor: Carlo Alberto Vazquez, Mexico (MX)

( * ) Notice: Subject to any disclaimer, the term of this patent is extended or adjusted under 35 U.S.C. 154(b) by 0 days.

This patent is subject to a terminal disclaimer.

(21) Appl. No.: 14/420,362

(22) PCT Filed: Jul. 25, 2013

(86) PCT No.: PCT/IB2013/002251
§ 371 (c)(1),
(2) Date: Feb. 7, 2015

(87) PCT Pub. No.: WO2014/024045
PCT Pub. Date: Feb. 13, 2014

(65) Prior Publication Data
US 2015/0211225 A1   Jul. 30, 2015

Related U.S. Application Data

(63) Continuation-in-part of application No. 13/569,068, filed on Aug. 7, 2012, now Pat. No. 8,517,037.

(51) Int. Cl.
| | |
|---|---|
| *E04B 1/343* | (2006.01) |
| *E04B 1/34* | (2006.01) |
| *E04B 1/35* | (2006.01) |
| *A01M 31/02* | (2006.01) |
| *E04H 1/12* | (2006.01) |

(52) U.S. Cl.
CPC ............ *E04B 1/34352* (2013.01); *A01M 31/02* (2013.01); *E04B 1/3412* (2013.01); *E04B 1/34357* (2013.01); *E04B 1/3544* (2013.01); *E04H 1/12* (2013.01); *E04B 2001/34389* (2013.01); *E04B 2001/34394* (2013.01)

(58) Field of Classification Search
CPC ... E04B 1/3412; E04B 1/3416; E04B 1/3442; E04B 1/34336; E04B 1/34347; E04B 1/34352; E04B 1/34357; E04B 1/34384; E04B 2001/34389; E04B 2001/34394; E04H 15/001; E04H 15/26; E04H 15/28; E04H 1/12; A01M 31/02
USPC ............ 135/98, 99, 139, 905; 52/64, 65, 79.5
See application file for complete search history.

(56) References Cited

U.S. PATENT DOCUMENTS

| | | | | | |
|---|---|---|---|---|---|
| 657,593 | A | * | 9/1900 | Dix | .................................. 312/3 |
| 1,478,904 | A | * | 12/1923 | Muzzi et al. | .................... 135/98 |

(Continued)

*Primary Examiner* — Robert Canfield

(74) *Attorney, Agent, or Firm* — Charles A. Lemaire; Jonathan M. Rixen; Lemaire Patent Law Firm, P.L.L.C.

(57) ABSTRACT

The Elevated Habitable Module is primarily an enclosed living space that folds to a very small size and deploys to a tall and large elevated living quarters. It is designed to be readily transported and erected by utilizing a light weight design that unfolds easily and is uncomplicated to assemble. The floor is secure from ground animals and people by elevating it off of ground level. The design also ensures important basic living features, such as electricity which is often not initially available on site in remote locations, and a method of collecting rain water along with filtration so it can be used for drinking or sanitation purposes. The supporting structure is suitable for a variety of places, including flat surfaces or rugged terrain.

20 Claims, 25 Drawing Sheets

(56) References Cited

U.S. PATENT DOCUMENTS

| | | | | |
|---|---|---|---|---|
| 1,498,111 A * | 6/1924 | Nelsen | | 135/96 |
| 1,543,134 A * | 6/1925 | Todd | | 52/13 |
| 3,167,081 A * | 1/1965 | Higgins | | 135/98 |
| 3,213,868 A * | 10/1965 | Forbes | | 135/98 |
| 3,255,990 A * | 6/1966 | Williams | | 249/27 |
| 3,546,831 A * | 12/1970 | Kratky et al. | | 52/115 |
| 3,599,378 A * | 8/1971 | Kachnic | | 52/29 |
| 3,600,865 A * | 8/1971 | Vanich | | 52/73 |
| 3,633,325 A * | 1/1972 | Bartoli | | 52/73 |
| 3,899,168 A * | 8/1975 | Besherse | | 472/75 |
| 3,905,166 A * | 9/1975 | Kaiser | | 52/65 |
| 3,921,354 A * | 11/1975 | Connelly et al. | | 52/236.1 |
| 4,056,902 A * | 11/1977 | Ziegler, Jr. | | 52/73 |
| 4,132,236 A * | 1/1979 | Petersen et al. | | 135/16 |
| 4,606,142 A | 8/1986 | Reneau | | |
| 5,090,435 A * | 2/1992 | Leclercq | | 135/98 |
| 5,102,179 A | 4/1992 | Royer | | |
| 5,135,018 A * | 8/1992 | Anderson | | 135/99 |
| 5,396,916 A * | 3/1995 | Boissonnault | | 135/16 |
| 5,522,186 A * | 6/1996 | Jarman | | 52/73 |
| 5,671,568 A * | 9/1997 | Armanno, Sr. | | 52/66 |
| 5,678,587 A * | 10/1997 | Bilotti | | 135/98 |
| 5,862,827 A | 1/1999 | Howze | | |
| 6,058,951 A * | 5/2000 | Wilson | | 135/20.3 |
| D436,184 S * | 1/2001 | Reiter | | D25/31 |
| 6,457,280 B1 * | 10/2002 | Park | | 52/65 |
| 6,463,946 B1 * | 10/2002 | Wu | | 135/16 |
| 6,948,587 B2 | 9/2005 | Griffiths | | |
| 7,188,635 B2 | 3/2007 | Johnson | | |
| 7,926,787 B2 | 4/2011 | Wieland | | |
| 8,001,985 B1 | 8/2011 | Conner | | |
| 8,578,955 B1 * | 11/2013 | Rothbaum | | 135/15.1 |
| 2002/0036008 A1 * | 3/2002 | Hickam et al. | | 135/98 |
| 2004/0083660 A1 | 5/2004 | Atkins | | |
| 2006/0076043 A1 * | 4/2006 | Talley et al. | | 135/98 |
| 2006/0151018 A1 * | 7/2006 | Wilson | | 135/16 |
| 2009/0183439 A1 * | 7/2009 | Vriens | | 52/80.1 |
| 2012/0036795 A1 * | 2/2012 | Correa | | 52/82 |

* cited by examiner

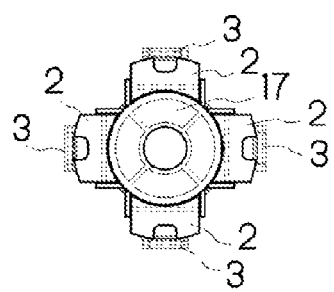
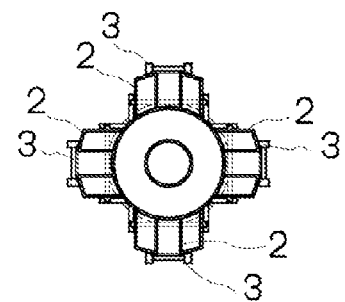
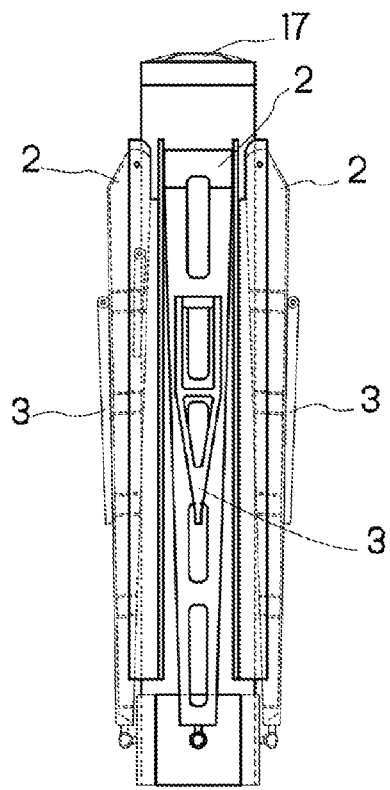
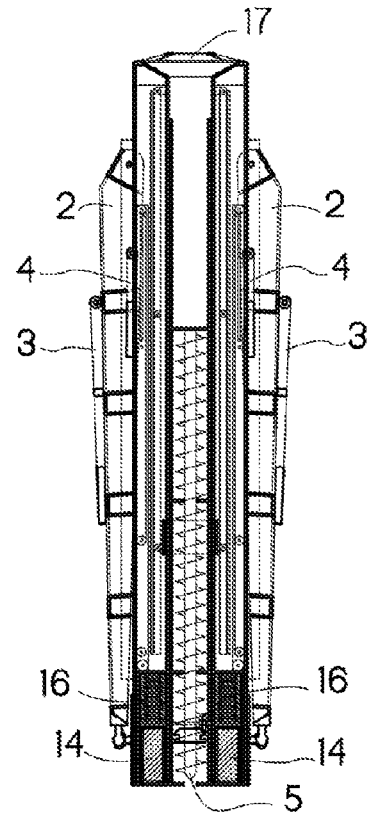
FIG. 2  FIG. 3

ELEVATED LIVING SPACE ASSEMBLY AND METHOD

CROSS REFERENCE TO RELATED APPLICATIONS

This is a U.S. national-stage patent application under 35 USC §371 from, and claims priority benefit under 35 USC §365(a)-(c) of, PCT Application No. PCT/IB2013/002251 filed Jul. 25, 2013 with the title "ELEVATED LIVING SPACE ASSEMBLY" (which is incorporated herein by reference for all purposes in its entirety), which claims priority benefit of U.S. patent application Ser. No. 13/569,068, filed on Aug. 7, 2012 by Carlo Alberto Vazquez and titled "ELEVATED LIVING SPACE ASSEMBLY" (which issued as U.S. Pat. No. 8,517,037 on Aug. 27, 2013).

TECHNICAL FIELD

BACKGROUND ART (1) Field of the Invention

This invention is directed to elevated living structures, in particular, portable or movable structures which are used for temporary living space in situations where it is desirable to have the living space elevated for security, safety, military, communication, or other reasons. In such situations is desirable to include a number of important features together in a compact design such as power, water, sanitary, convenience, compactness, and light weight in a manner that is suitable for the needs of personnel in the field. It is desirable to have a compact, lightweight structure, easily assembled by unskilled personnel with little training that is useful for disaster relief, scientific research, light security requirements, photography, news reporting, government personnel on temporary assignment due to an urgent field need, and other requirements.

(2) Description of Related Art

Others have sought to provide an elevated habitable platform, but have not considered the multiple needs of personnel in the field.

For example, U.S. Pat. No. 6,948,587 describes a compact elevated platform for a chair that is pulled by a vehicle, but there is no consideration for a lightweight design, creating a temporary living condition, or providing essential services such as power or water. Nor would it be stable in situations such as a high wind or provide shelter from rain.

Similarly U.S. Pat. No. 7,926,787 is an elevated platform for persons to enjoy recreational activities, but there is no consideration for a lightweight design, creating a temporary living condition, or providing essential services such as power or water.

Similarly, U.S. Pat. No. 5,862,827 is an elevated platform for observation or for a hunting blind, but no consideration is given for the essentials of living.

U.S. Pat. No. 8,001,985 is a compact design package for living quarters, but little consideration is given to design weight or elevating the living platform off of the ground.

US 2004/0083660 is a mobile elevated hut, there is no consideration as to minimizing weight or compactness for transportation.

A design is needed in the marketplace that encompasses the needs for overall compactness that allows field personnel to carry housing into the field at a weight of 300 Kg or less, and provides for initial services such as power and water, and creates shelter from wind and rain.

DISCLOSURE OF THE INVENTION

The Elevated Habitable Module (or elevated living space assembly) is an enclosed living space that folds to a very small size for transporting. It is designed to be very easily transported and erected by utilizing a light weight design that unfolds easily and is uncomplicated to assemble. It is secure from ground animals and people by elevating the living platform off of ground level. It incorporates important basic living features, such as portable power which is often not initially available on site in remote locations, and a method of collecting rain water along with filtration so it can be effectively used for drinking or sanitation purposes. It incorporates supporting structure suitable for a variety of places, including flat surfaces or rugged terrain.

BRIEF DESCRIPTION OF DRAWINGS

FIGS. 2-3 show cross sections of the vertical support system assembly in its folded state.

MODES FOR CARRYING OUT THE INVENTION

When the Elevated Habitable Module (EHM) is collapsed it can be transported from one place to another easily because it is designed with very light and strong materials, such as aluminum, fiberglass, or composites. It is designed to shelter people and equipment to conduct surveillance, observation, monitoring, research, working as a command or control post, laboratory, shelter, etc. It produces electric energy through solar cells, a wind turbine, or both, and collects rain water for storage and use. The interior is isolated from the ground environment at a floor height of up 10 feet (3.48 m). It can be transported in light duty vehicles such as a pickup truck, van, or a trailer.

In one embodiment, when completely collapsed/folded up for transporting, it measures approximately 10 feet long by 3 feet in diameter. When it is fully deployed (i.e. open) it has a total height of 22 feet with an enclosed living area of approximately 180-185 square feet. Its typical overall weight is 250-300 kg and the central supporting structure (FIG. 1) can be carried by four people. In a preferred embodiment, the weight is 300 kg or less.

Figure 1:
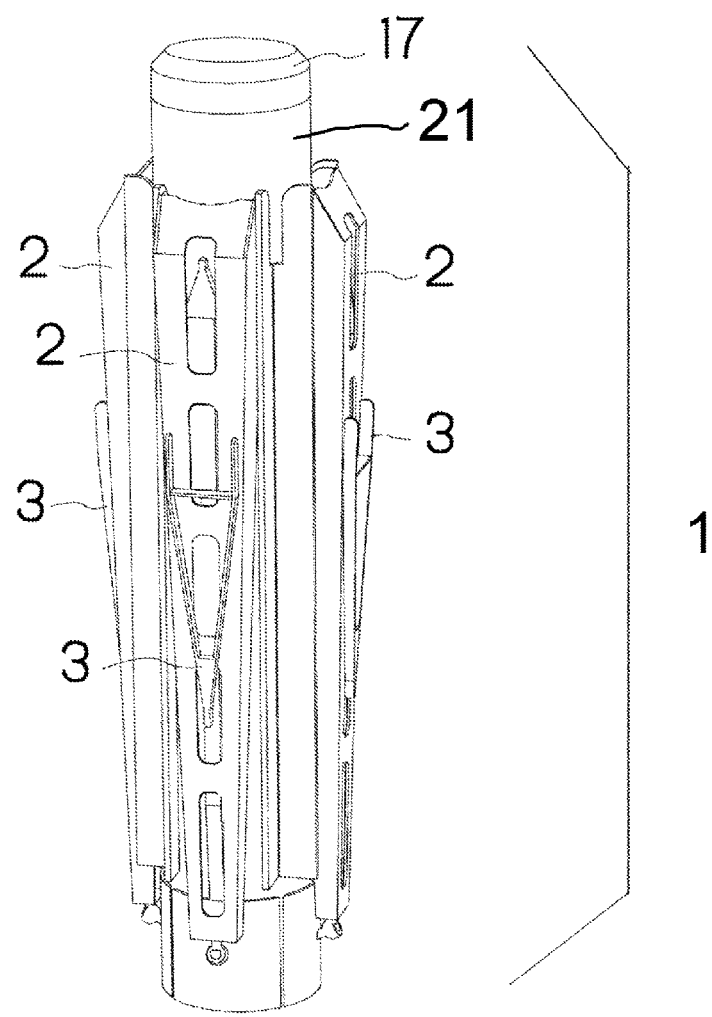
FIG. 1 shows an isometric view of the vertical support assembly fully compacted/folded up.

As shown in FIG. 1, the vertical support assembly 1 in its collapsed state is transported to the chosen location and placed in a vertical orientation. Support legs 2 and upper leg support arms 3 are indicated in their folded/stored state. A water filter 17 is visible on the top which is used to filter the rainwater that runs through it. In a preferred embodiment, the rain water drips through the filter. Alternately, the rainwater is pumped through the water filter. FIGS. 2-3 show additional details of the lower leg support arms 4 and filtered water storage system 16, but the full water storage volume is not available until the unit is deployed. The water is storable directly in the vertical telescoping support pole 21 by using suitable seals, or alternately, by utilizing collapsible plastic bags to prevent leaks. The design allows for approximately 200 liters of water storage. An optional pump (not shown) is used to dispense water. Batteries 14 are located at the bottom of the vertical supporting pole, and are charged by solar cells that are located on the roof. In a preferred embodiment, the batteries are located at the top of the vertical telescoping support pole. Alternately, the batteries are charged by a portable generator (not shown) that is run by a fuel source such as diesel fuel.

Figure 4:
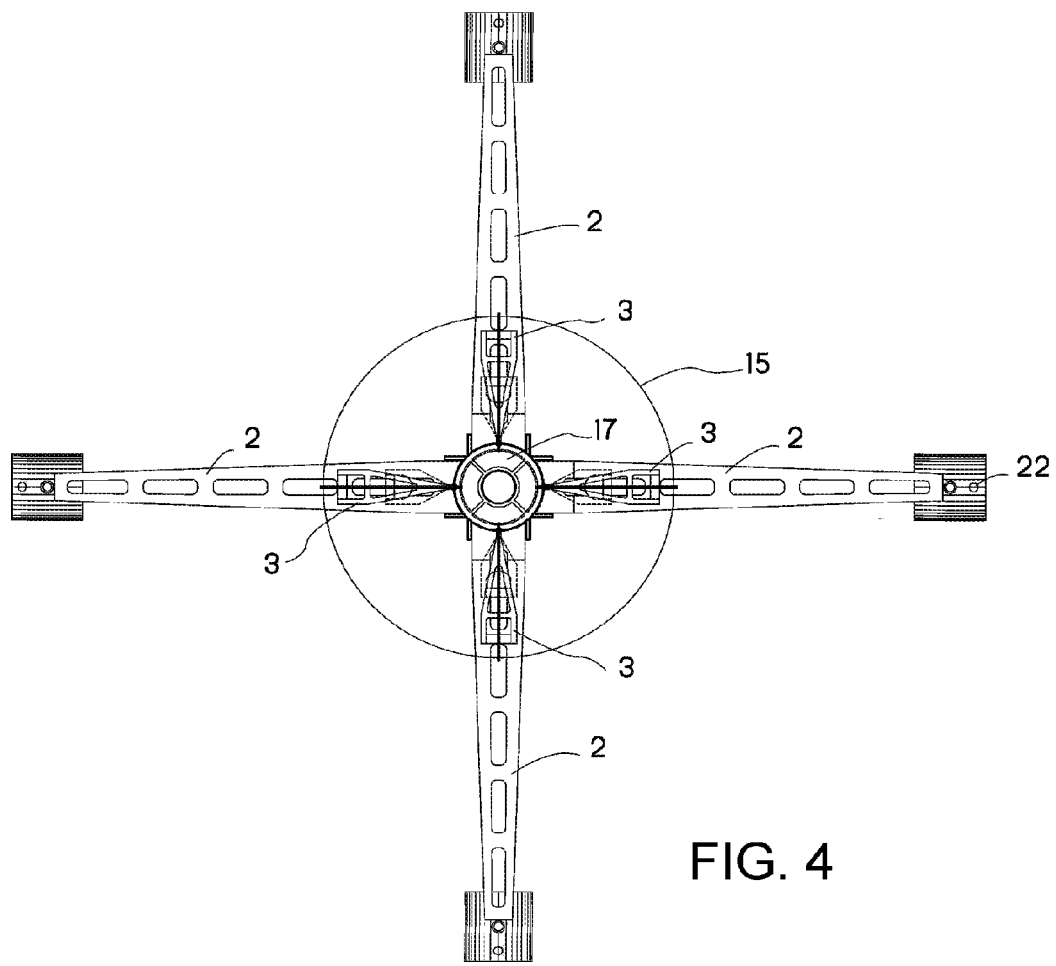
FIGS. 4-5 show the vertical support assembly as it is initially unfolded, with the rain water catcher assembled on top.
Figure 5:
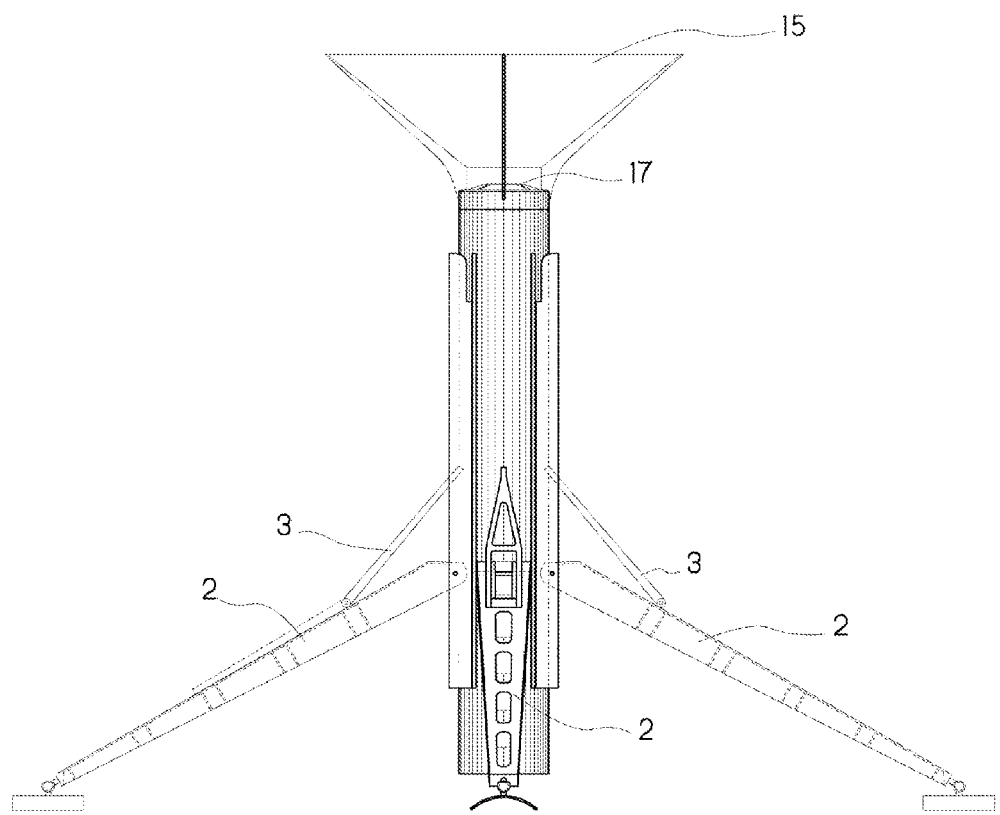
Figure 7:
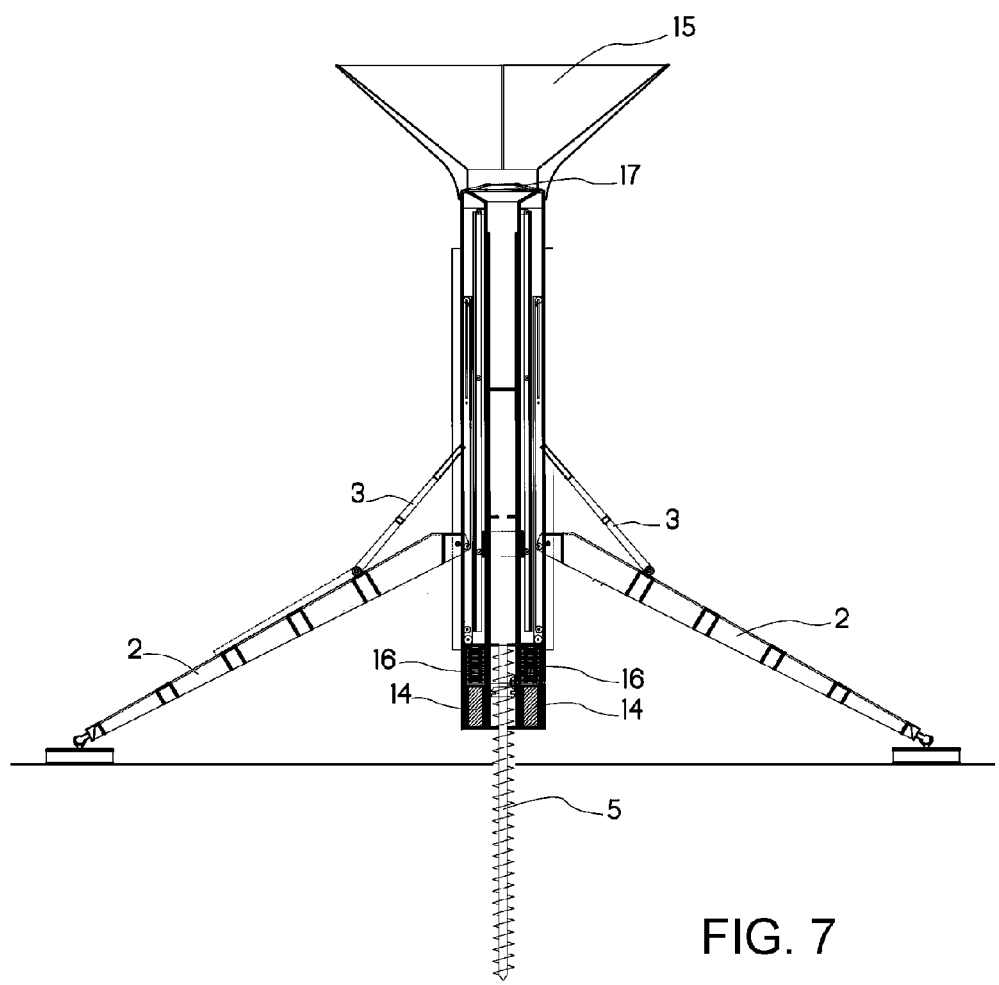
FIG. 7 shows a cross sectional view of the vertical support assembly as it is initially unfolded, with a drill bit, i.e. soil bit, extended into the soil for additional support.

As seen in FIGS. 4-5, the support legs 2 are released once the support assembly is vertical and resting on solid ground. The support legs pivot at one connected end and then spread out as shown from the vertical telescoping pole. They engage the ground surface and are secured in place as shown in FIG. 7. In FIG. 4, holes 22 in the feet of the support legs are shown which can be used for ground stakes to improve wind resistance.

Figure 6:
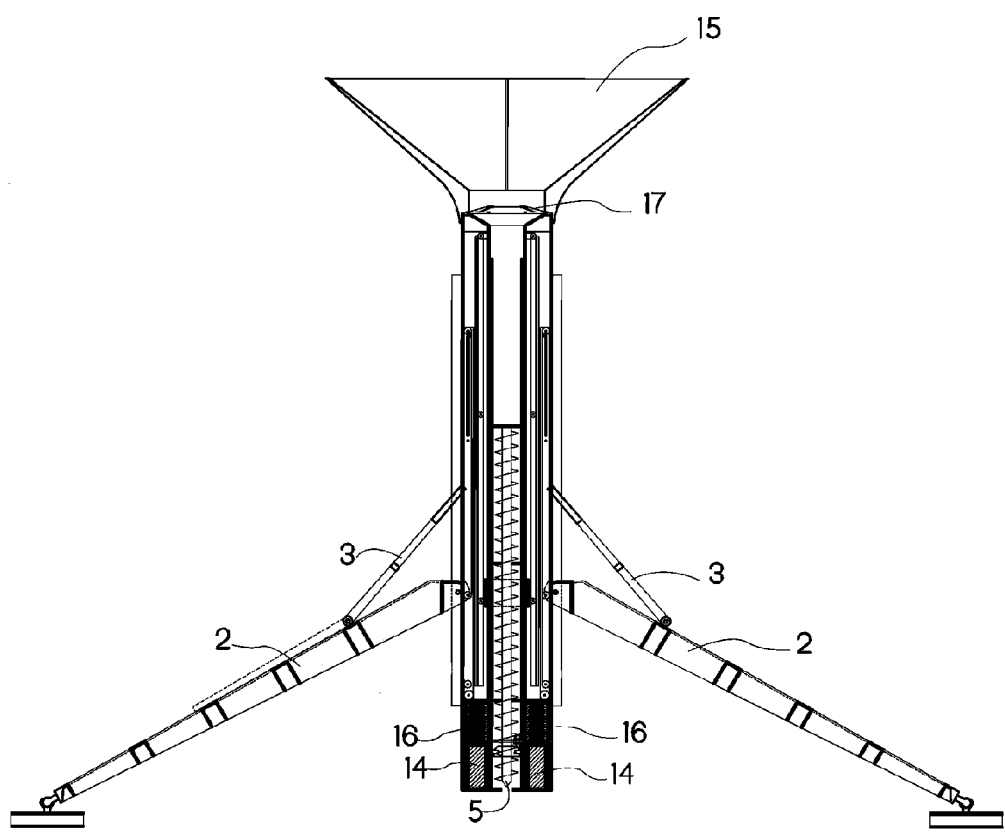
FIG. 6 shows a cross sectional view of the vertical support assembly as it is initially unfolded.

FIG. 6 shows a cross section with the soil drill 5 after the vertical support assembly is deployed. The rain water catcher 15 is shown attached to the top. However, it is not normally attached at this time during the deployment process.

FIG. 7 shows a cross section with soil drill 5 extended into the soil for stability. In FIG. 7, the supporting legs 2 are secured in place by upper leg support arm 3 and lower leg support arm 4. The upper leg support arm 3 and lower leg support arm 4 are typical connecting members which stabilize and secure the structural supports that unfold from the vertical telescoping pole. They are adjusted in place in the field, and their exact connection locations allow for the support leg positions to vary based on whether the terrain is rough or flat.

The soil drill 5 is then rotated/driven downward to penetrate the soil to provide more vertical stability. This is done by using a power tool and inserting it into a horizontal gearing opening and the end of the vertical telescoping pole, and rotating the soil drill 5 end so it penetrates the soil and is driven downward.

Figure 8:
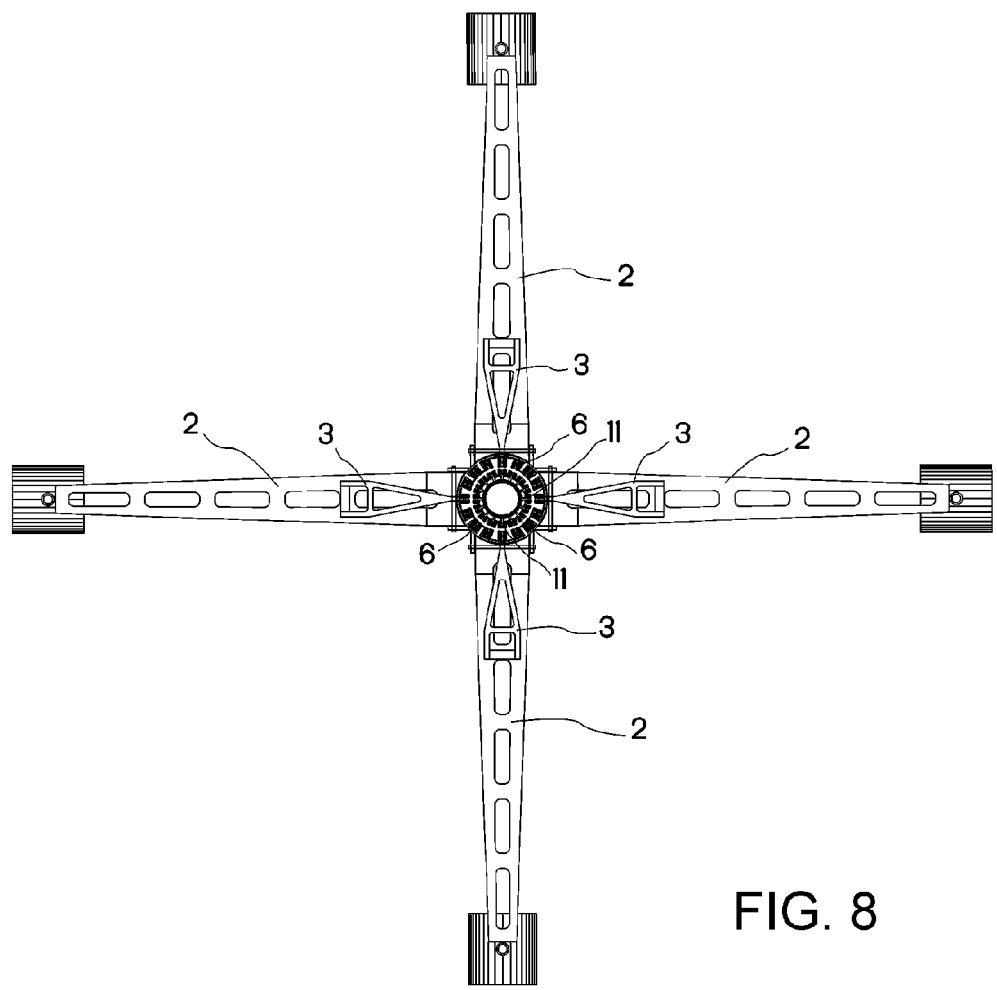
FIG. 8 shows a plan view of FIG. 7.
Figure 9:
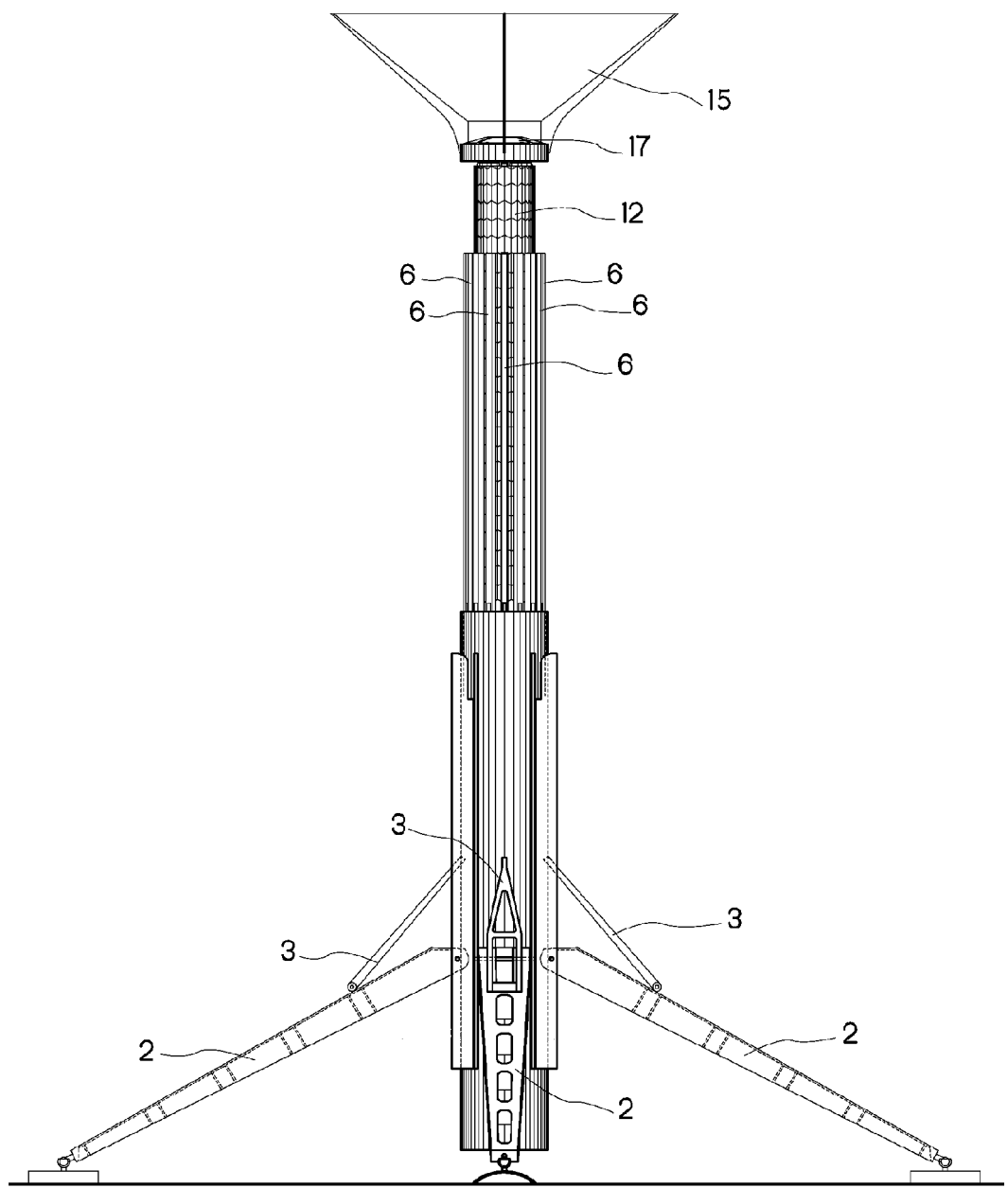
FIG. 9 shows a further extension of the vertical support upwardly, extending its height.

FIGS. 8-9 show the vertical support assembly being extended upwardly via an extension of the vertical telescoping pole so that the floor and roof can be assembled. The location of the roof supports 11, roof covers 12, and floor supports 6 in the vertical support assembly are now indicated.

Figure 10:
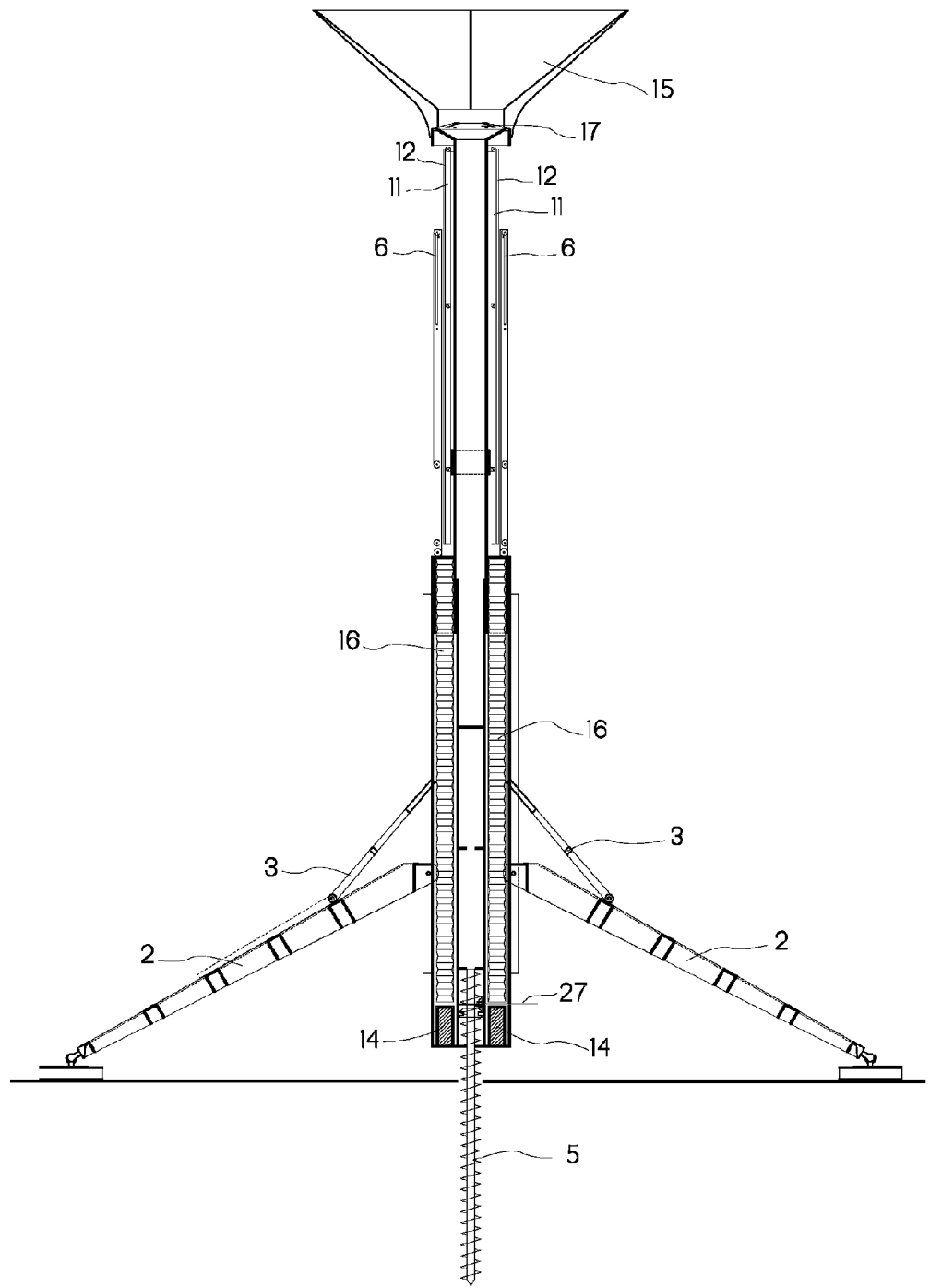
FIG. 10 shows the vertical assembly with the rain catcher assembled and the drill bit extended.

FIG. 10 is a cross section of FIG. 9 to illustrate the location of the filtered water storage 16 which is now larger, and the roof supports 11. An external driving shaft is connected to an internal gearing system 27 as illustrated at the base of the vertical telescoping pole. This is used to extend the soil drill 5. A power tool or a manual tool can be connected to the external driving shaft which is inserted through a hole in the vertical telescoping pole.

Figure 11:
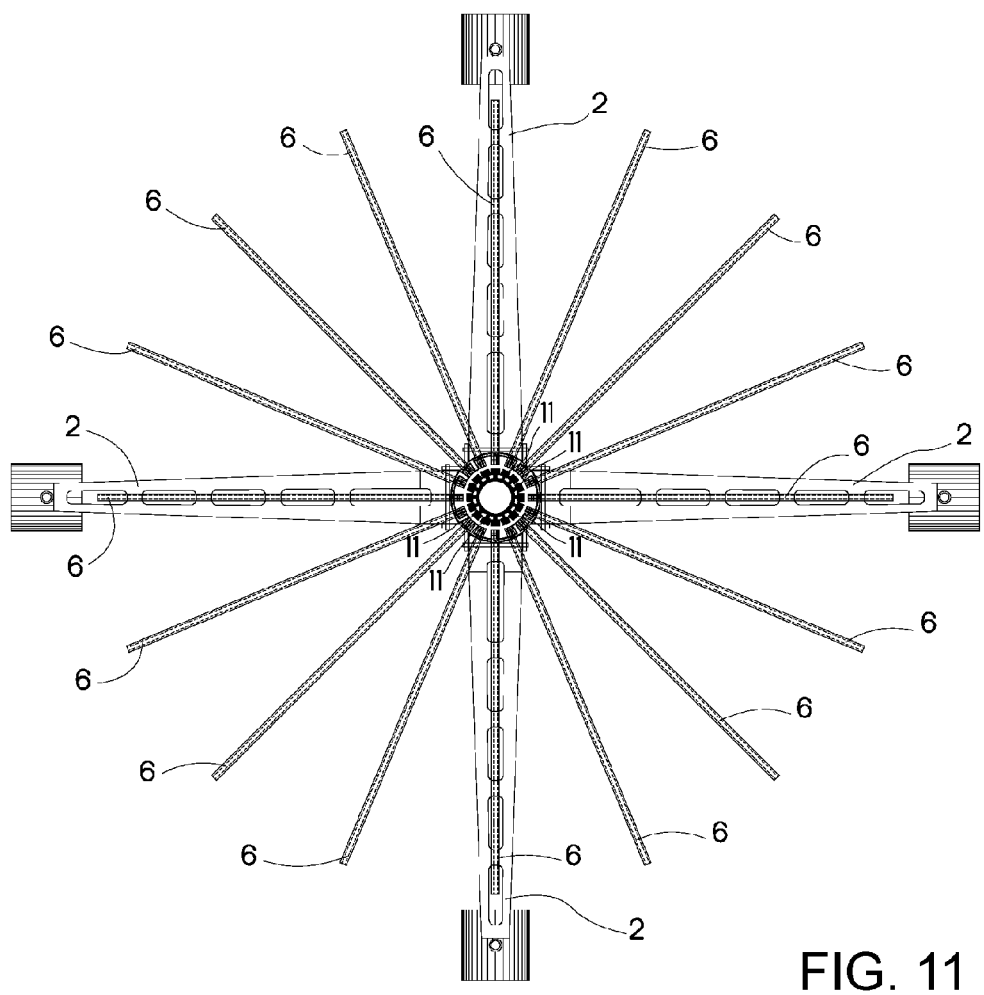
FIG. 11 shows a plan view of the extension of the floor supports.
Figure 12:
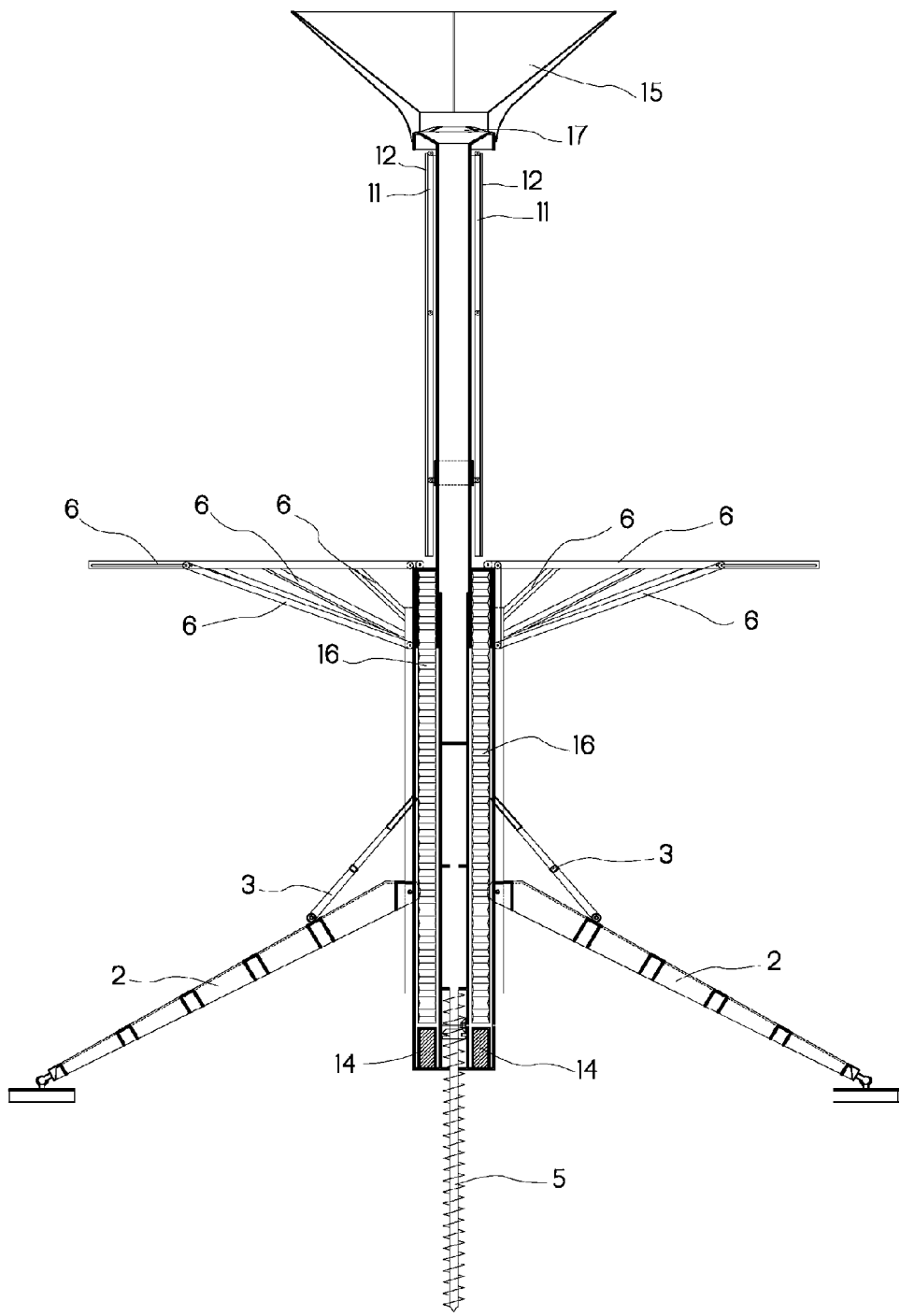
FIG. 12 shows a profile view of the vertical support with the floor support arms assembled.

FIGS. 11-12 show the deployment of the floor supports 6 while the roof supports 11 remain folded up. The floor supports pivot at one connected end from storage and then spread out as shown from the vertical telescoping pole. As illustrated, there are additional supports, i.e. connecting members, under the horizontal floor supports which brace and stabilize the horizontal floor supports. A typical height for a floor would be 10 feet from the ground.

Figure 13:
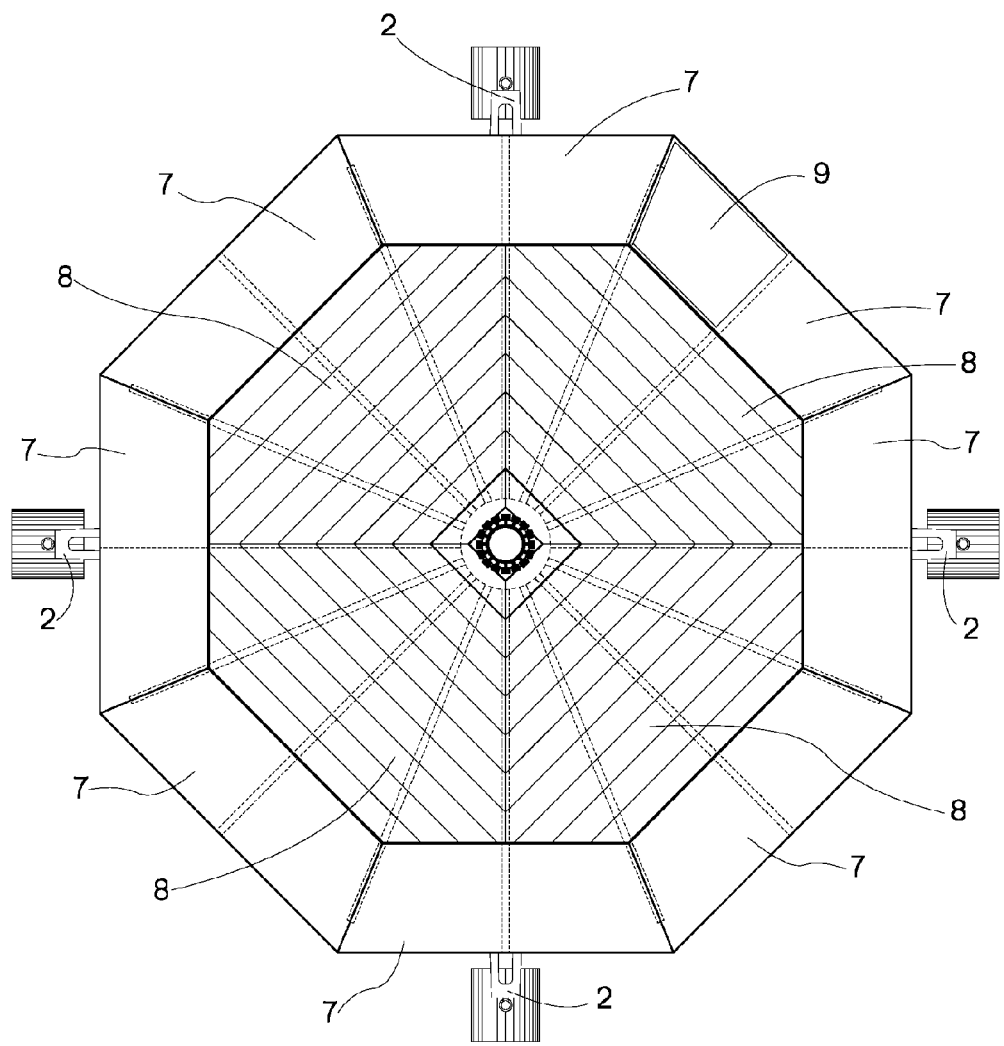
FIG. 13 shows a plan view of the elevated floor.
Figure 14:
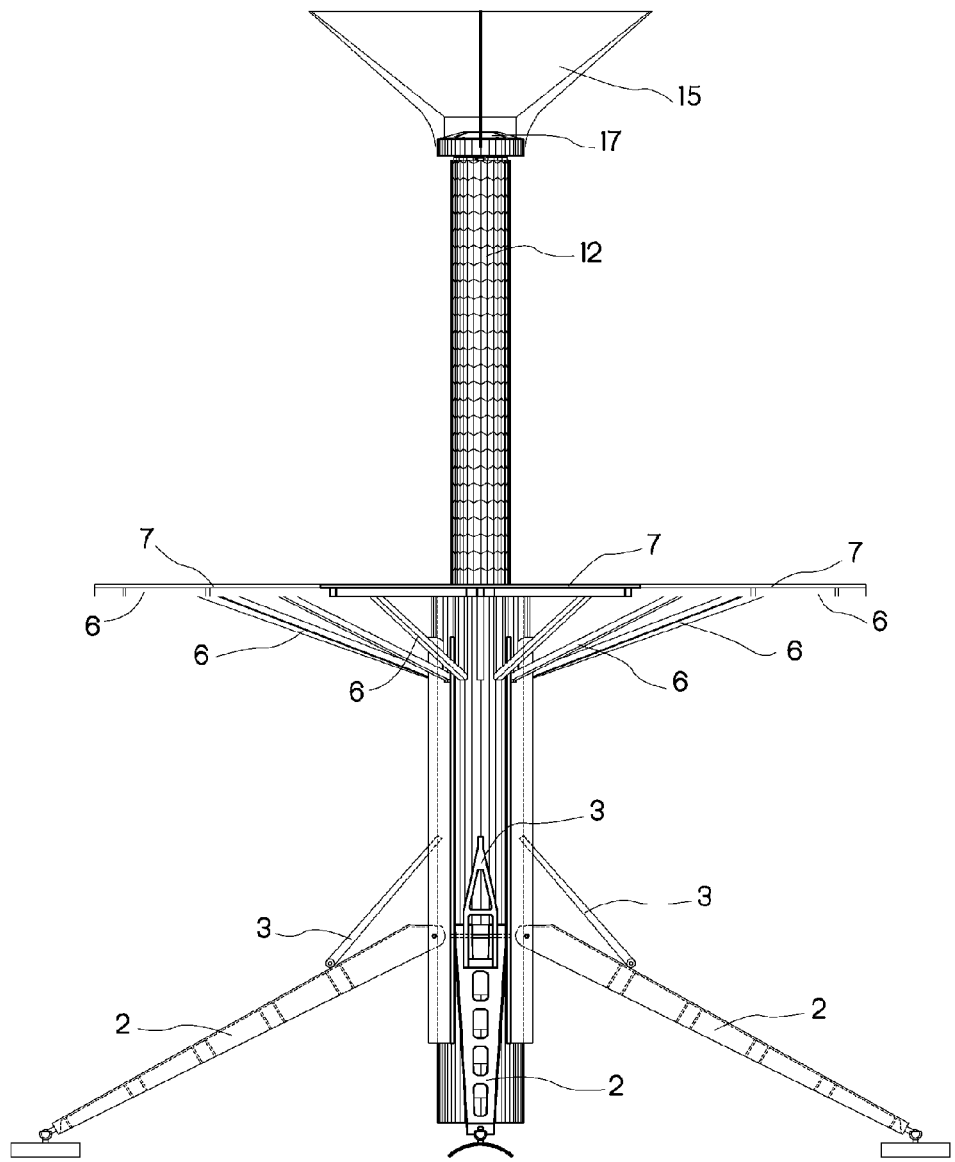
FIG. 14 shows a profile view of the elevated floor.

FIGS. 13-14 show the installation of the inner and outer floor panels 8, 7 and the hatch 9.

Figure 15:
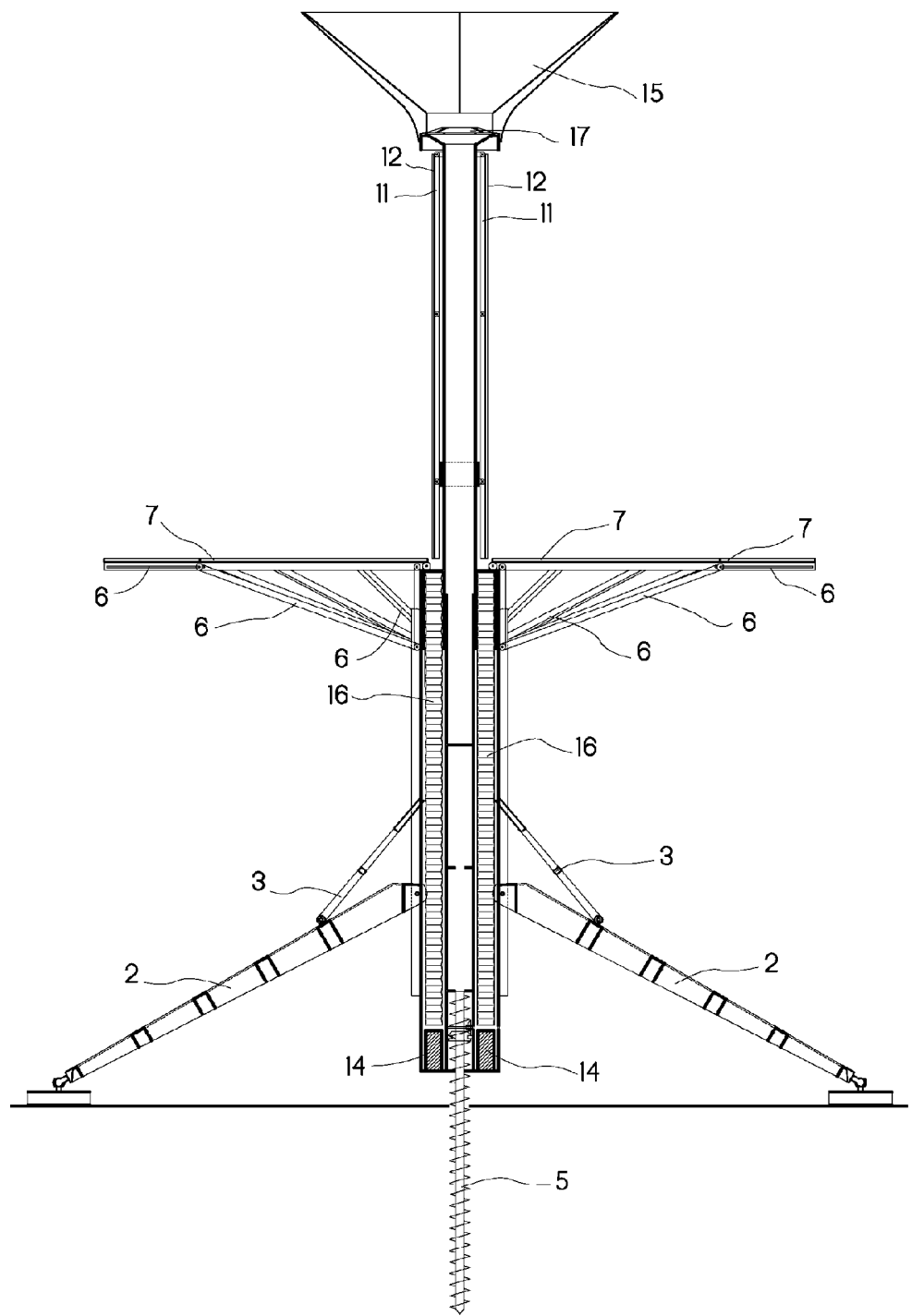
FIG. 15 shows a cross sectional view of the elevated floor.

FIG. 15 shows the location of the roof supports 11 and roof covers 12 in the vertical support assembly. The roof supports pivot at one connected end from storage and then spread out as shown from the vertical telescoping pole. As illustrated, there are multiple supports, that is, connecting members which brace and stabilize the roof supports.

Figure 16:
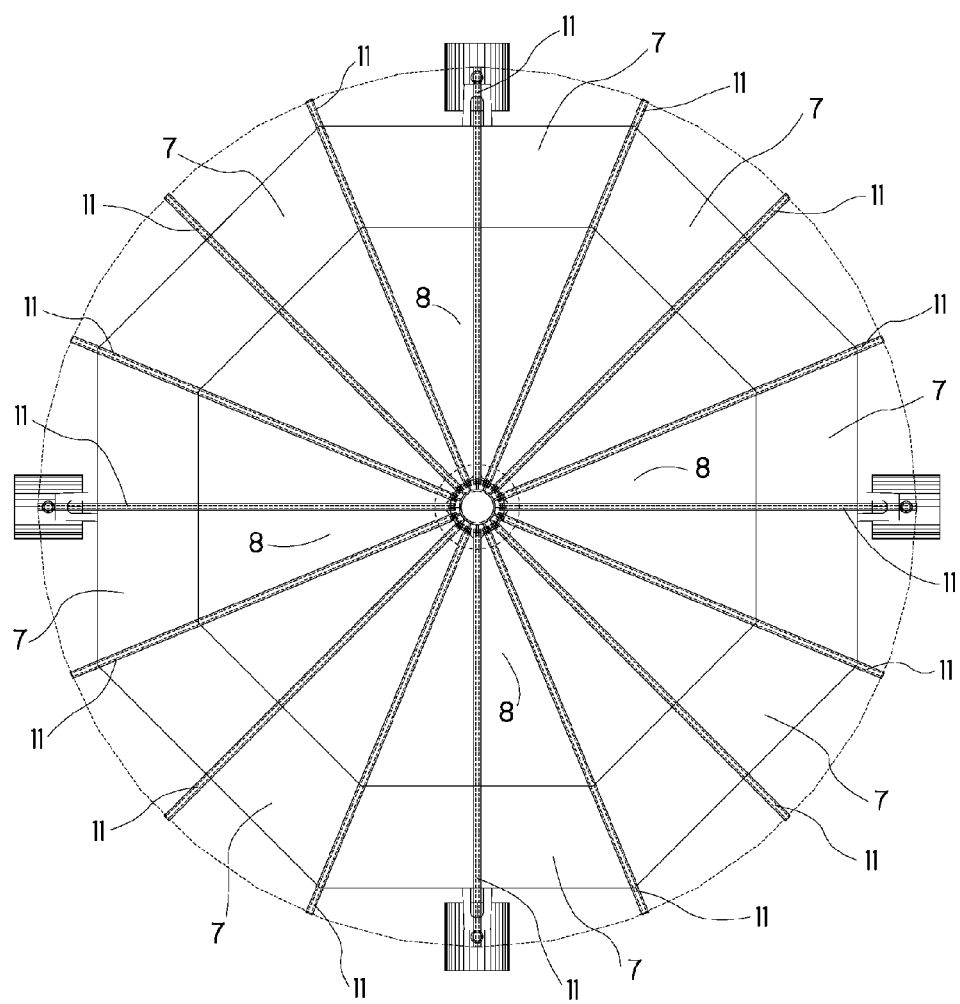
FIG. 16 shows a plan view of the elevated floor and extended roof supports.
Figure 17:
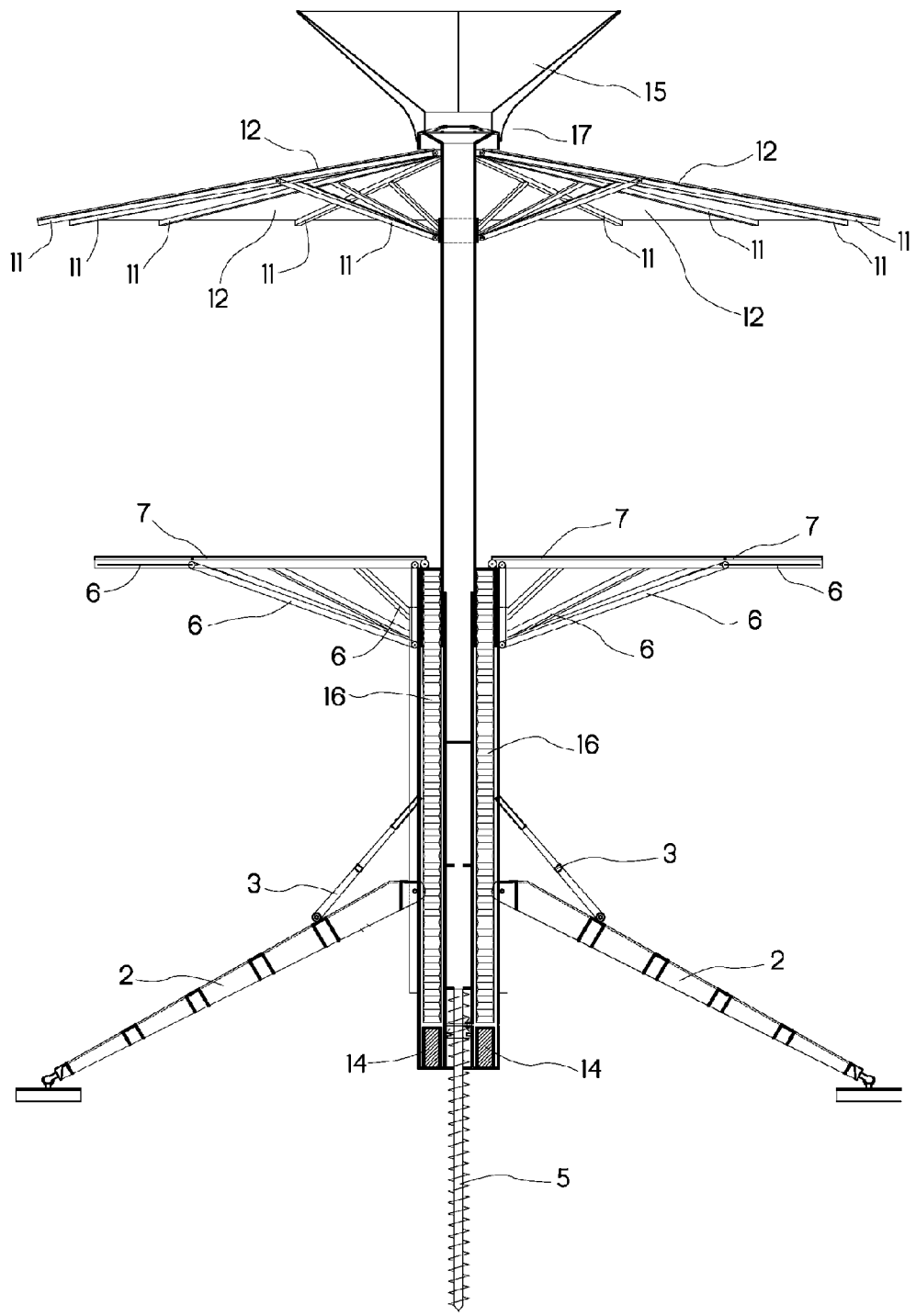
FIG. 17 shows a profile view of the elevated floor and extended roof supports.

FIGS. 16-17 show the deployment of the of the roof supports 11 and location of the roof cover 12 in the vertical support assembly before it is deployed.

Figure 18:
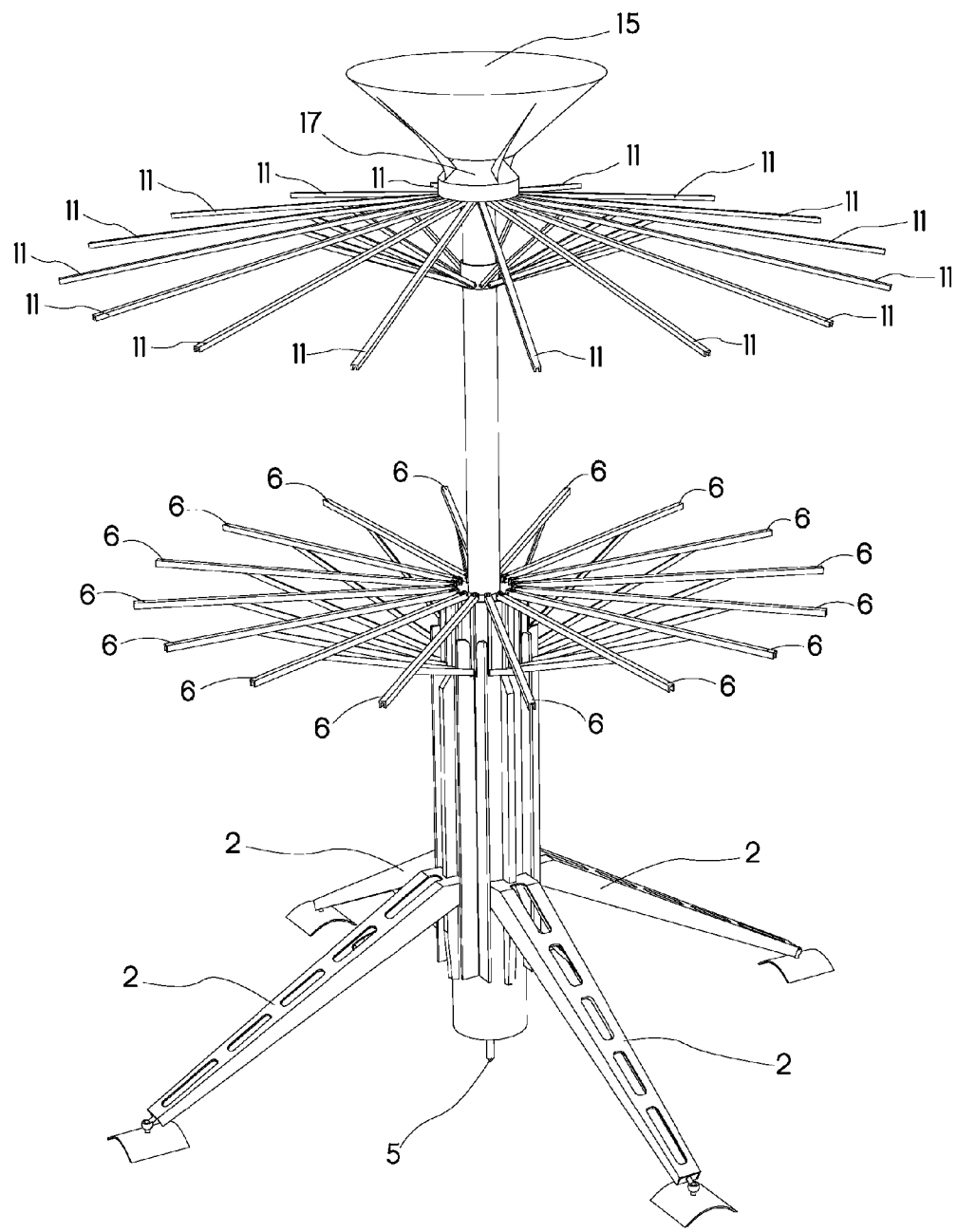
FIG. 18 shows an isometric view of the vertical pole, legs, floor supports, roof supports, and rain catcher.

FIG. 18 is an isometric view showing the floor supports 6 and the roof supports 11.

Figure 19:
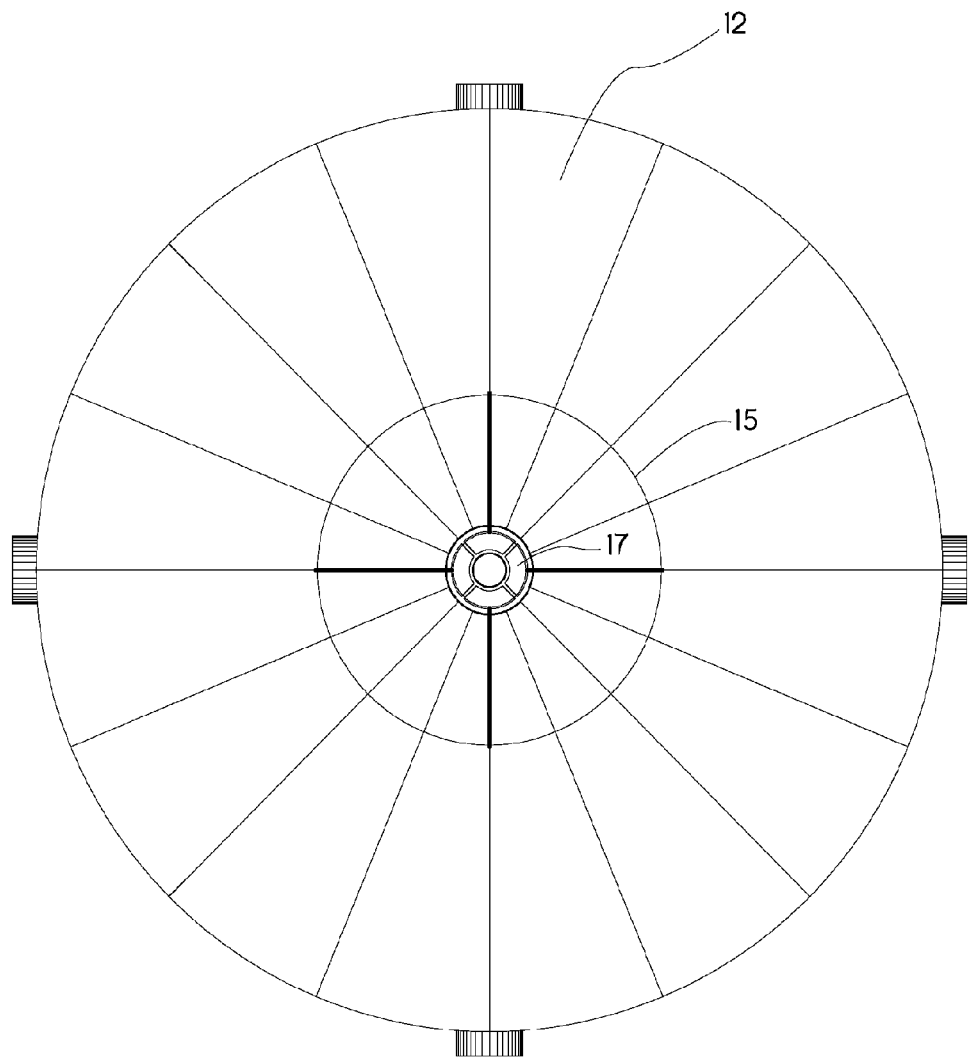
FIG. 19 shows a plan view of the roof covers, rain catcher, and water filter.
Figure 20:
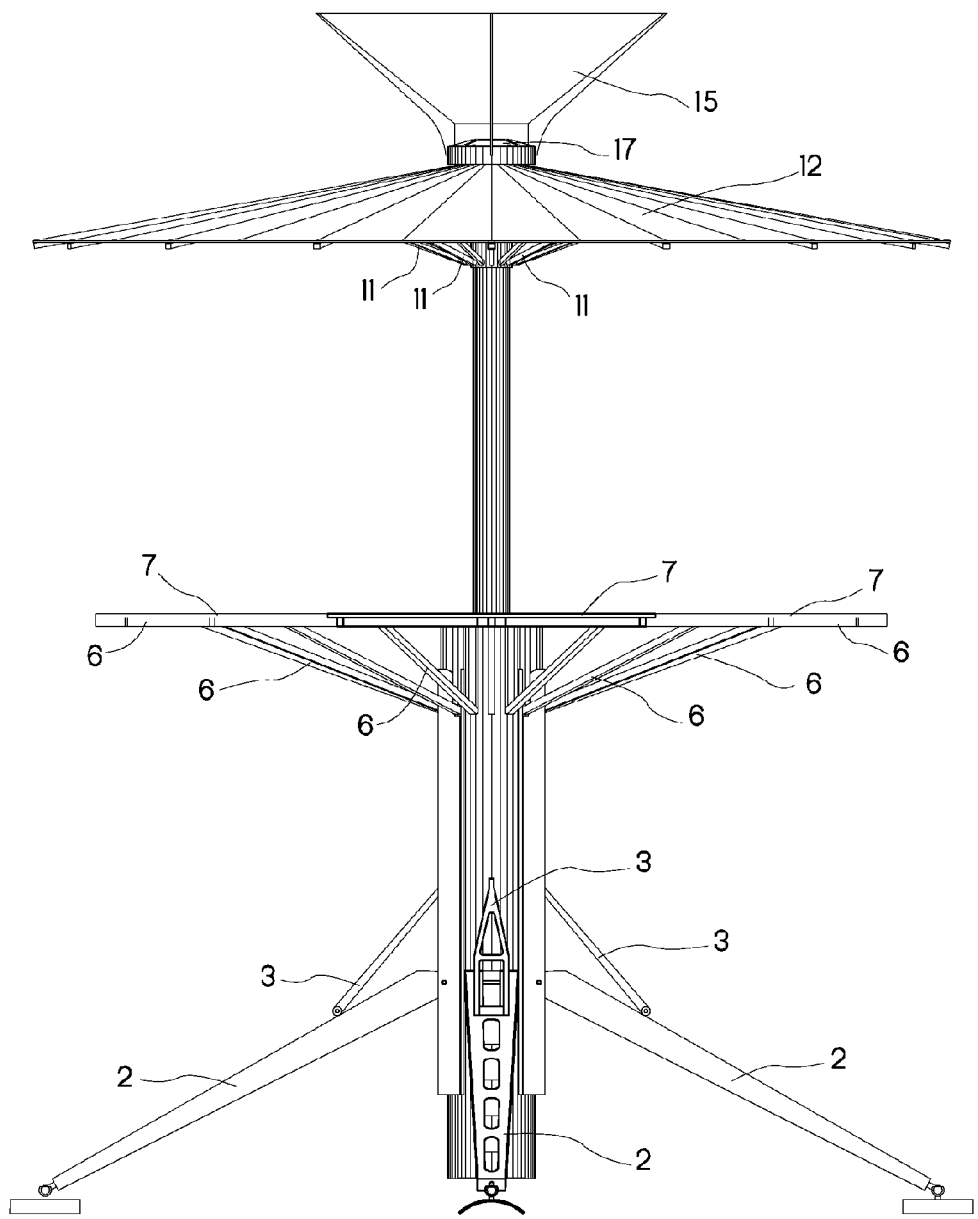
FIG. 20 shows a profile view of FIG. 19.

FIGS. 19-20 show the deployment/installation of the roof covers 12 on the roof supports 11. In a preferred embodiment, the roof cover is insulated and is made up of a waterproof fabric and incorporates flexible solar cells to generate electricity that is stored in batteries 14. Alternately, solar cells can be deployed on top of the cover after it is installed, or setup nearby as a separate unit to facilitate sun tracking.

Figure 21:
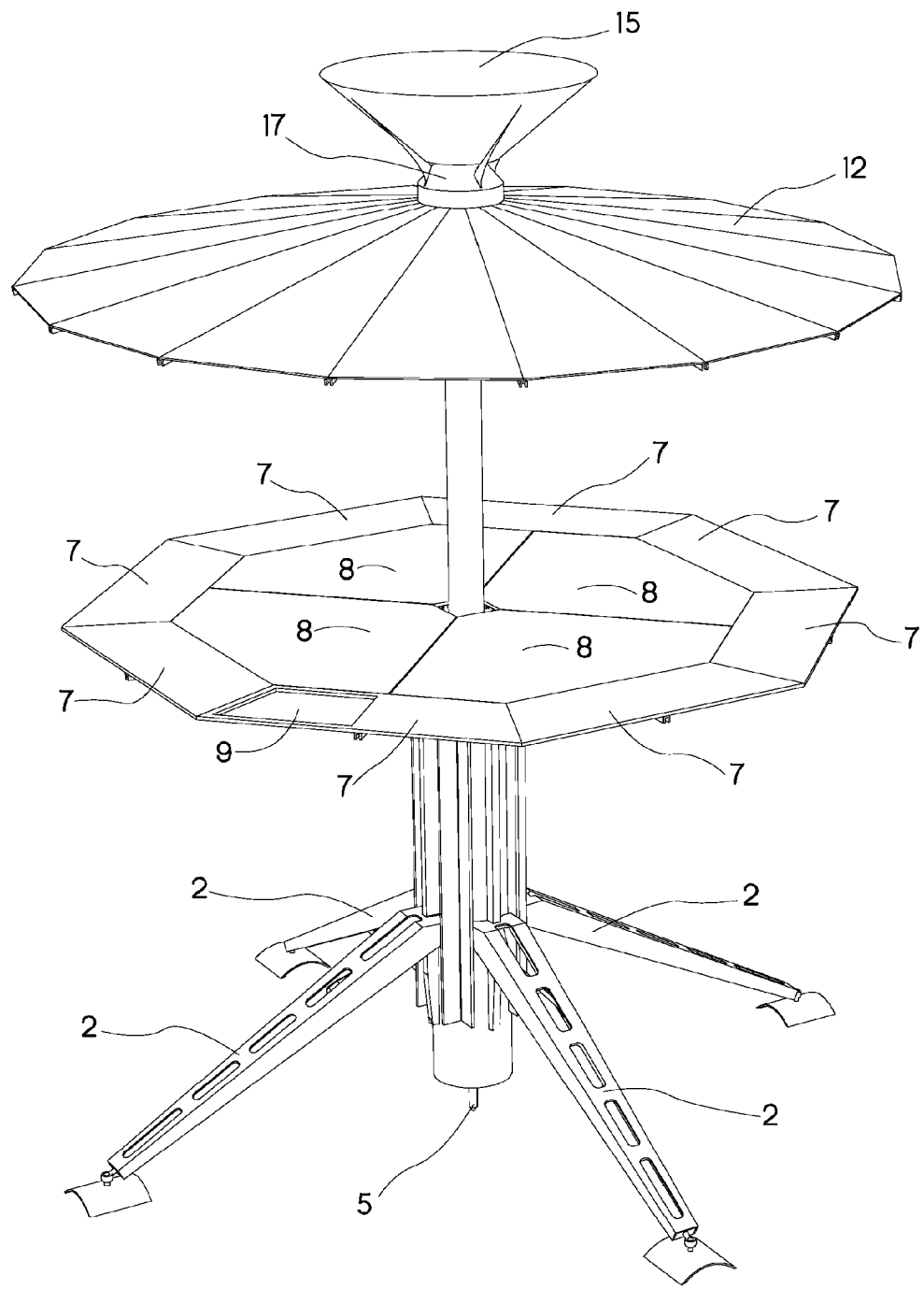
FIG. 21 shows an isometric view of FIGS. 18-19.

FIG. 21 shows an isometric view of the roof covers 12 and the inner floor cover 8, outer floor cover 7, and hatch 9.

Figure 22:
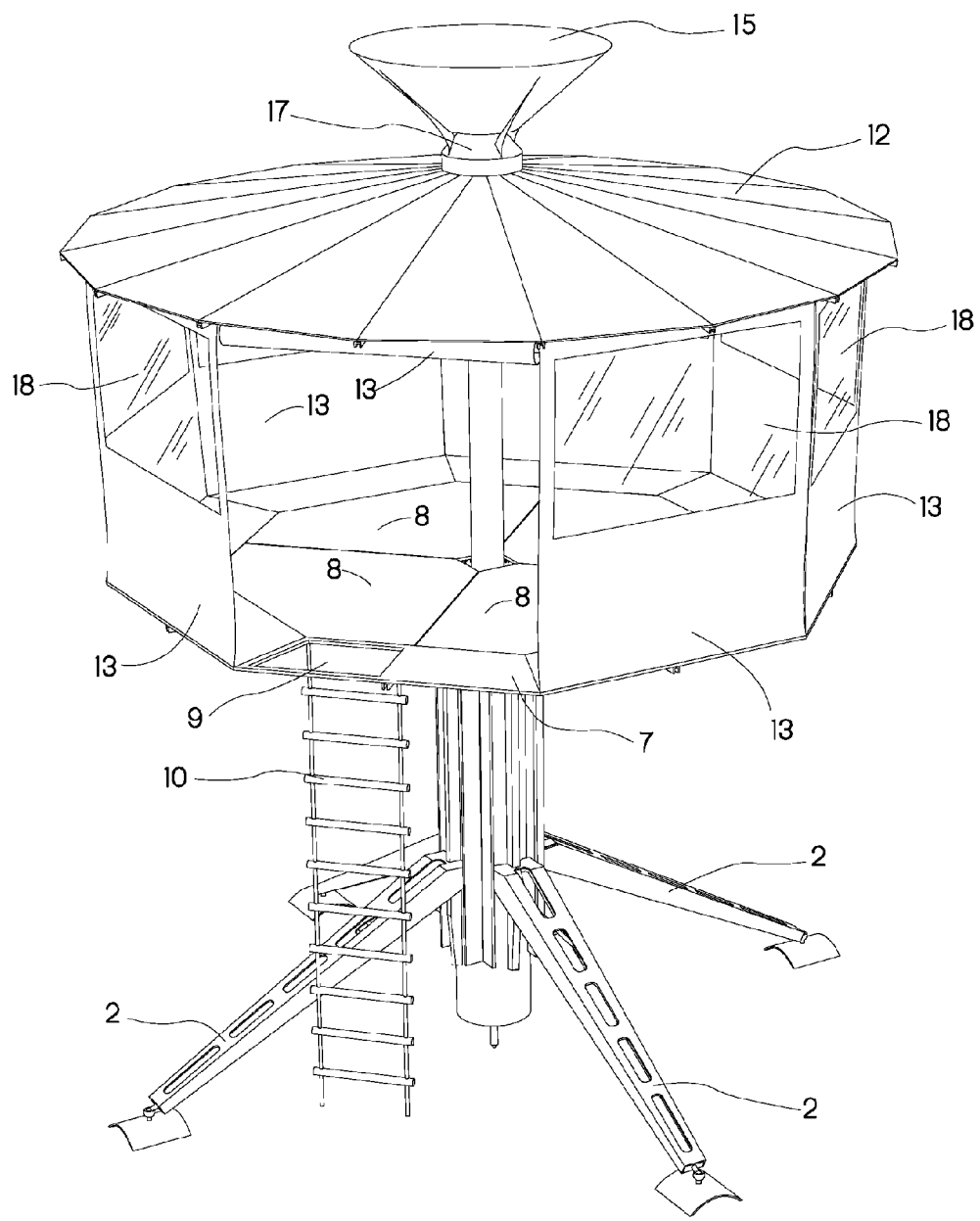
FIG. 22 shows an isometric view of a complete freestanding assembly.

FIG. 22 shows an isometric view of the EHM with side covers 13 and transparent sections 18 and entry ladder 10 so that personnel may enter and leave the EHM. The side covers 13 or side curtains are made of waterproof fabric with insulating properties and optionally include transparent sections 18 to enable the view to the outside are placed during deployment by attaching them to the roof structure and fixing them to the floor panels. The side covers are attached to the floor covers and roof covers, or the supporting structures, and are designed to span the area between the floor and roof.

Figure 23:
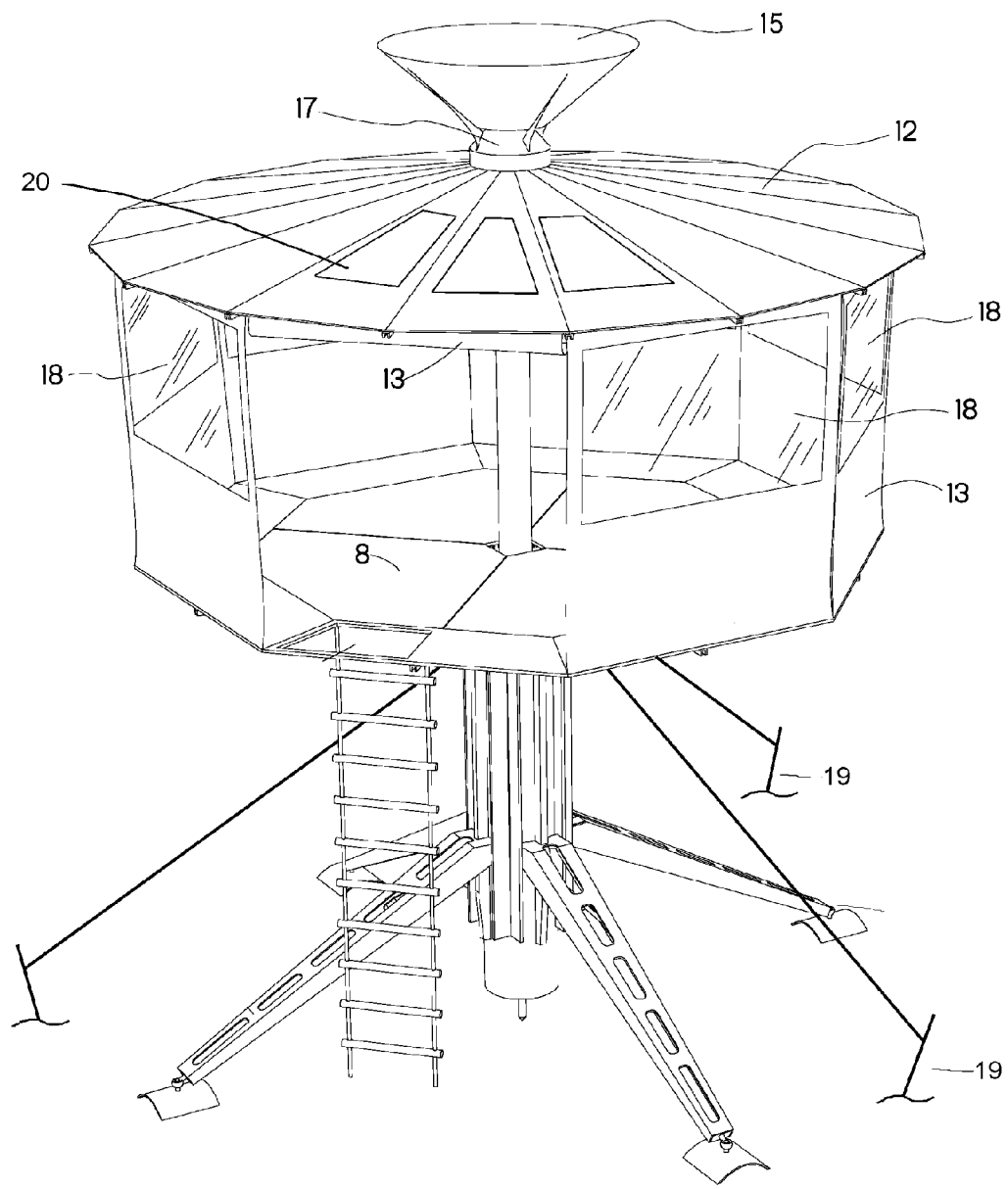
FIG. 23 shows an isometric view of a complete assembly with ground anchor stays for high wind situations or locations where the soil bit is not usable.

FIG. 23 shows an isometric view of the EHM with ground stabilization tension wires 19 or ropes to provide additional stabilization to secure the vertical assembly from high winds or forces that would cause the EHM to tip. The tension wires can also be attached to other natural or manmade objects such as trees, rocks, buildings, and supporting structures. Solar cells 20 are also shown on the roof.

When fully deployed as illustrated in FIGS. 22-23, the living space is 10 feet from ground level and has a firm floor surface on which you can walk. You can perform the activities previously mentioned.

Figure 24:
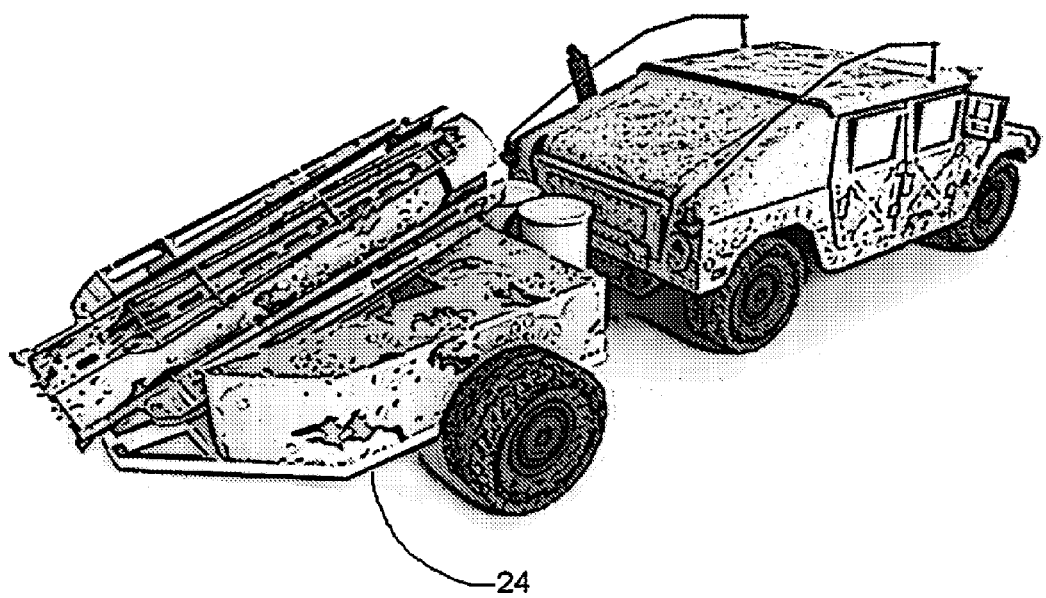
FIG. 24 shows a view of a trailer which transports the vertical support assembly and other assembly items that comprise the overall elevated living space.

FIG. 24 shows an embodiment where the EHM is transported on a small, compact trailer 24 by a utility vehicle. The vertical support assembly is shown, and covered storage compartments are used to house components that are not mounted on the vertical support assembly. Also, needed power and any hand tools required for assembly are stored on the trailer.

Figure 25A:
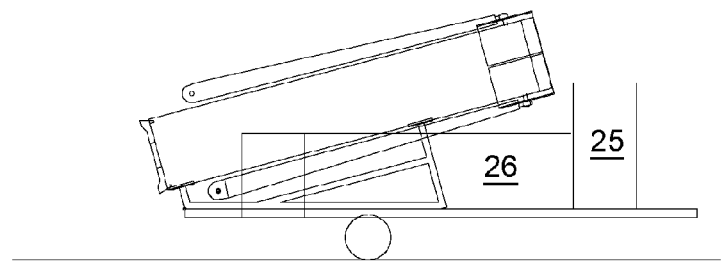
FIGS. 25A-C show a view of how the trailer is used to initially set the vertical support assembly in place.
Figure 25B:
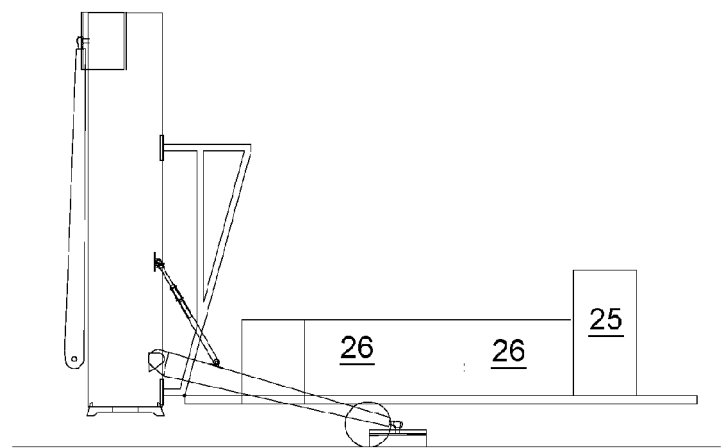
Figure 25C:
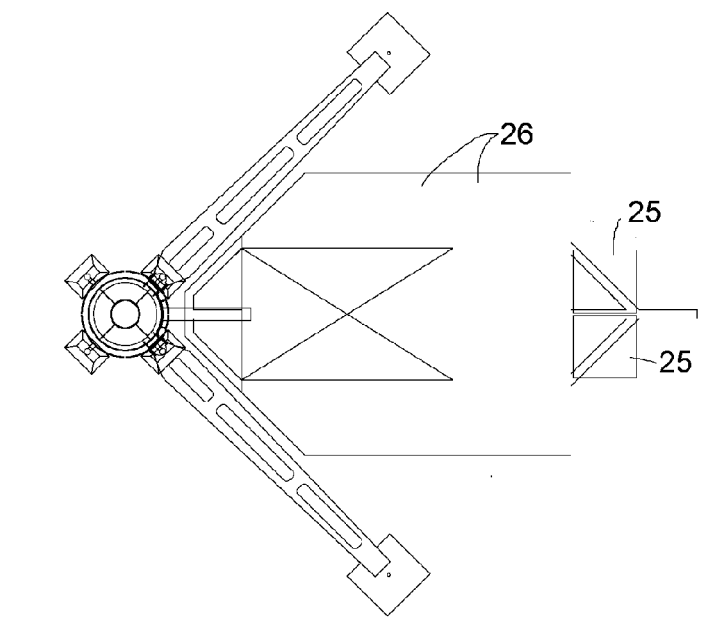

FIGS. 25A, B, and C shows the trailer with les supports that are easily set in place as the vertical support assembly is lifted and tipped off of the trailer. Note that the trailer is not a rectangular (as seen in a plan view) shape so that the support legs can be immediately and conveniently extended when the Vertical Support Assembly is lifted/tipped off of the trailer. The vertical support assembly is light enough to be handled by three or four men, but it would be considered an unwelcome burden to move a distance. Optional hardware such as slide out plates or articulating arms may be installed on the trailer to facilitate positioning the vertical support assembly in the vertical position immediately behind the trailer.

Storage compartments 26 mounted on the trailer house needed tooling for assembly of the EHM as well as any loose components which include the floor covering panels, solar cells (if not integral to the roof), side covers, an entry ladder which will attach to the floor covers or the floor supports, a rainwater collector, rainwater filter/purifier system, portable generator if a larger amount of electricity is needed, external sanitary facilities, and any EHM assembly hardware. Also integral to the trailer are water containers 25 or water compartments for general use on site.

Figures 26A, 26B:
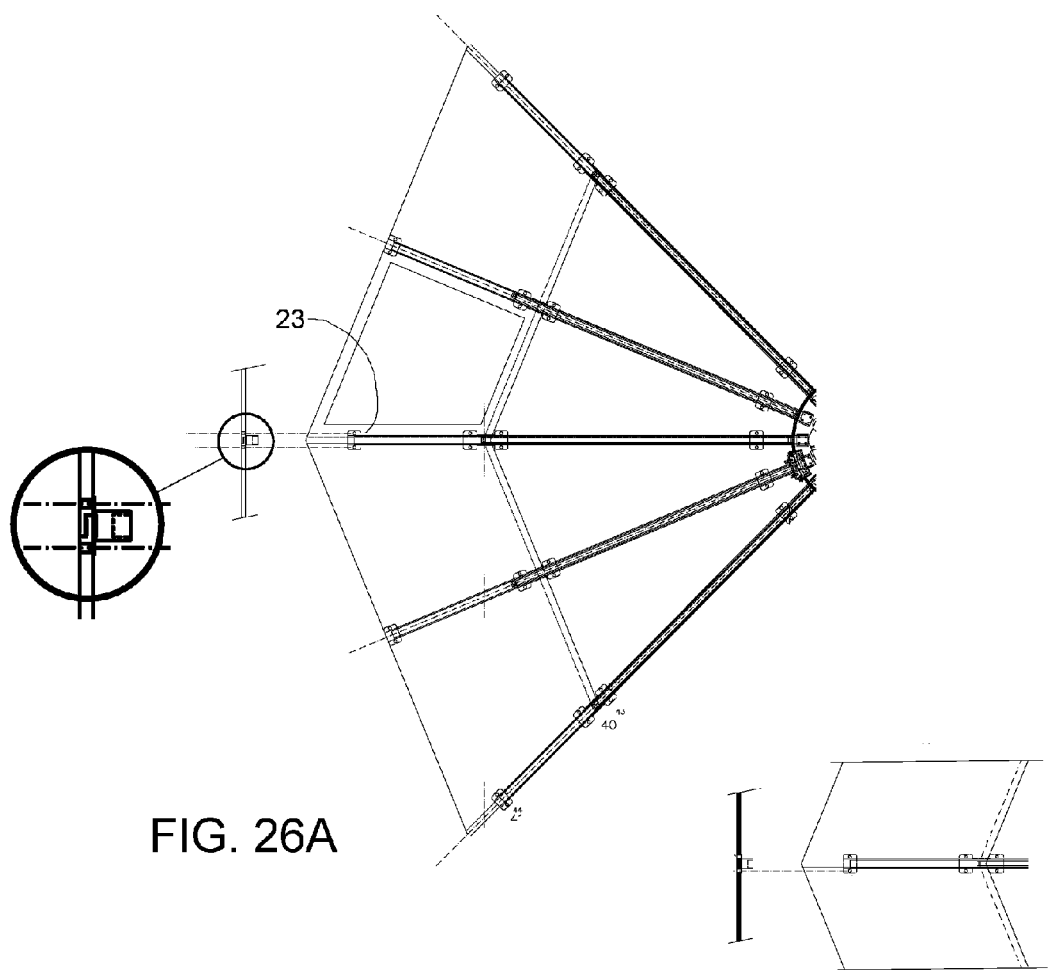
FIGS. 26A-B show a floor mounting detail.

FIGS. 26A-B shows a floor mounting detail. Bracket plates 23 are used to secure the floor panels to the floor supports. They can be interlocking and overlapping the floor supports as shown in FIGS. 26A and 26B. Alternately, they can be simple bracket plates and bolts with suitable integrated seals to prevent water leaking.

For convenience, the parts illustrated on the drawings are:

| Item No. | Description |
| --- | --- |
| 1 | Vertical Support Assembly |
| 2 | Support Leg |
| 3 | Upper Leg Support Arm |
| 5 | Drill Bit (or Soil Drill) |
| 6 | Floor Support |
| 7 | Outer Floor Panel |
| 8 | Inner Floor Panel |
| 9 | Hatch |
| 10 | Entry Ladder |
| 11 | Roof Support |
| 12 | Roof Covers |
| 13 | Side Covers |
| 14 | Batteries |
| 15 | Rainwater Collector |
| 16 | Filtered Water Storage |
| 17 | Water Filter |
| 18 | Transparent Section |
| 19 | Tension Wires (or ropes) |
| 20 | Solar Cells |
| 21 | Vertical Telescoping Pole |
| 22 | Foot Hole |
| 23 | Floor Bracket Plate |
| 24 | Trailer |
| 25 | Water Containers |
| 26 | Storage Compartments |
| 27 | Shaft/Gearing System |

In one embodiment, the floor is designed to support 300 kg/m² and the whole structure will support 1200 kg of weight (including personnel and equipment).

In one embodiment, the structure is designed for winds of up to 40 mph. In another embodiment, the structure is capable of up to 50 mph with minor enhancements such as wire stays. Additional vertical supporting members that anchor the vertical support assembly could also be used to increase the wind design even higher.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A method for providing an elevated living space on a surface, the method comprising:
   positioning a support assembly in a vertical position on the surface;
   extending a plurality of supporting legs from the support assembly to the surface, wherein the plurality of supporting legs are connected to the support assembly and are configured to maintain the support assembly in the vertical position;
   deploying a plurality of floor supports, wherein each of the plurality of floor supports is connected to the support assembly;
   installing a plurality of floor panels on the plurality of floor supports;
   unfolding a plurality of roof supports, wherein each of the plurality of roof supports is connected to the support assembly;
   attaching a plurality of roof covers to the plurality of roof supports;
   penetrating a portion of the support assembly into the surface for vertical stability; and
   collecting rainwater, filtering the collected rainwater, and storing the filtered rainwater.

2. The method of claim 1, wherein the positioning of the support assembly further includes lifting the support assembly off of a trailer.

3. The method of claim 1, further comprising:
   including a plurality of solar cells on the plurality of roof covers; and
   charging a plurality of batteries using electricity from the plurality of solar cells.

4. The method of claim 1, further comprising:
   providing a plurality of tension wires connected to the elevated living space;
   stabilizing the elevated living space using the plurality of tension wires.

5. The method of claim 1, wherein the collecting of the rainwater includes catching the rainwater in a rainwater catcher connected to the support assembly.

6. The method of claim 1, wherein the storing of the filtered rainwater includes utilizing a water-storage system located inside the support assembly.

7. The method of claim 1, further comprising:
   providing a plurality of side covers;
   attaching the plurality of side covers to the plurality of roof supports.

8. An elevated living space assembly comprising:
   a vertical telescoping pole;
   a plurality of supporting legs connected to the vertical telescoping pole;
   a plurality of floor supports connected to the vertical telescoping pole;
   a plurality of floor panels configured to attach to the plurality of floor supports;
   a plurality of roof supports connected to the vertical telescoping pole;

a plurality of roof covers configured to attach to the plurality of roof supports;
a rainwater collector that includes a water-filter system, wherein the rainwater collector is attached to a top of the elevated living space assembly; and
a water-storage system operably connected to the rainwater collector.

9. The assembly of claim 8, further comprising a wall system configured to attach between a periphery of the plurality of floor panels and a periphery of the plurality of roof covers to enclose a volume of space for human habitation.

10. The assembly of claim 8, further comprising a lifting assembly attached to the living space assembly and configured to lift the living space assembly off of a trailer.

11. The assembly of claim 8, further comprising:
a plurality of solar cells located on the plurality of roof covers; and
a plurality of batteries connected to the solar cells and configured to store electrical energy from the plurality of solar cells.

12. The assembly of claim 8, further comprising:
a plurality of tension wires connected to the elevated living space that are configured to stabilize the elevated living space.

13. The assembly of claim 8, wherein the water-storage system is located inside the vertical telescoping pole.

14. The assembly of claim 8, further comprising:
a plurality of side covers that are attached to the plurality of roof supports.

15. The assembly of claim 8, further comprising:
a plurality of side covers that are attached to both the plurality of floor panels and the plurality of roof supports.

16. An elevated living space comprising:
a support pole assembly configured to be arranged in a vertical position on a ground surface;
means for maintaining the support pole assembly in a vertical position, wherein the means for maintaining are connected to the support pole assembly;
a plurality of floor panels;
means for supporting the plurality of floor panels on the support pole assembly, wherein the means for supporting the plurality of floor panels are connected to the support pole assembly and to the plurality of floor panels;
a plurality of roof covers;
means for supporting the plurality of roof covers on the support pole assembly, wherein the means for supporting the plurality of roof covers are connected to the support pole assembly and to the plurality of roof covers;
means for penetrating a portion of the support pole assembly into the ground surface for vertical stability, wherein the means for penetrating are connected to the support pole assembly;
means for collecting rainwater, wherein the means for collecting rainwater are attached to a top of the elevated living space;
means for filtering the collected rainwater, wherein the means for collecting rainwater are attached to the means for filtering; and
means for storing the filtered rainwater, wherein the means for storing the filtered rainwater are attached to the means for filtering.

17. The elevated living space of claim 16, further comprising:
means for lifting the support pole assembly off of a trailer.

18. The elevated living space of claim 16, further comprising:
means for collecting solar energy; and
means for storing energy coupled to receive electrical energy from the means for collecting solar energy.

19. The elevated living space of claim 16, further comprising:
means for stabilizing the elevated living space using tension.

20. The elevated living space of claim 16, further comprising:
means for enclosing the elevated living space around its sides.

* * * * *